Patented May 15, 1923.

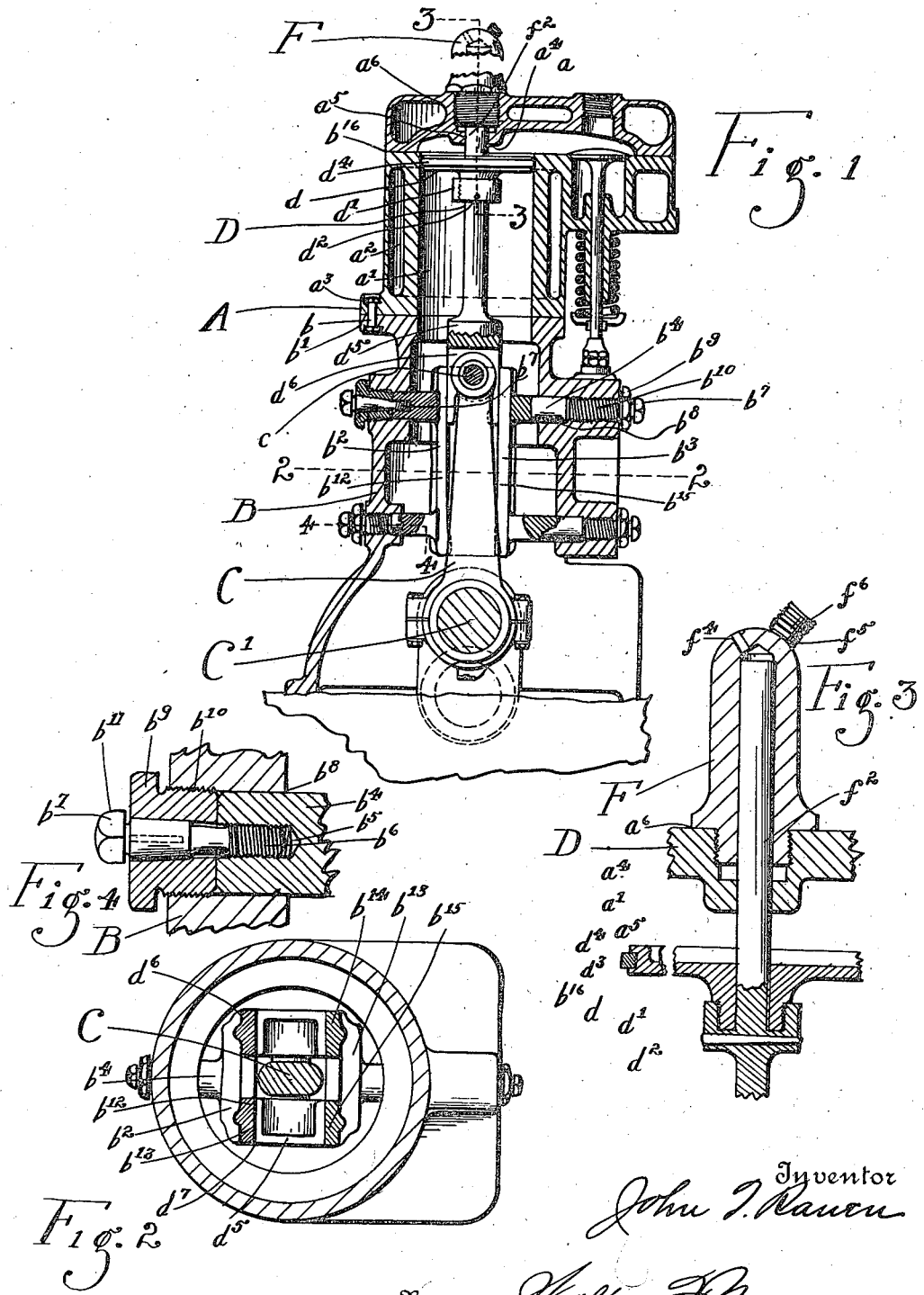

1,455,008

UNITED STATES PATENT OFFICE.

JOHN T. RAUEN, OF DAYTON, OHIO.

INTERNAL-COMBUSTION ENGINE.

Application filed July 12, 1920. Serial No. 395,803.

*To all whom it may concern:*

Be it known that I, JOHN T. RAUEN, a citizen of the United States of America, and resident of Dayton, in the county of Montgomery and State of Ohio, have invented a new and useful Improvement in Internal-Combustion Engines, of which the following is a specification.

An object of my invention is to provide an internal combustion engine having a much shorter cylinder than now used, and that will be much lighter in weight than engines now giving an equivalent horse power.

Another object is to provide an engine in which the high grade of work and labor now necessary, may be dispensed with, and in which the piston does not require the accurate grinding and finishing that has been necessary up to this time.

Another object is to provide an engine that is readily modified to either an air cooled or water cooled type, and that as an air cooled type of engine will be safe and economical, and will not develop the knocking and wear in the cylinder common to the present types of engines.

Another object is to prevent the thrust of the crank shaft digging the piston into the cylinder wall, thereby eliminating re-grinding of the cylinder.

Another object is to transmit the crank shaft thrust to the base chamber housing of the engine and to provide means to take up the wear resulting from such thrust.

Another object is to provide an engine, the upper end of whose piston rod can be used as an auxiliary pump.

Another object is to assure proper lubrication of the engine parts, and to eliminate excessive consumption of oil, and to reduce the average formation of carbon in the cylinder.

Another object is to dispense with machining of several parts of the engine, thereby conserving labor and time.

Another object is to prevent seizing of the piston by the cylinder due to changes in temperature to which the engine is submitted.

Another object is to prevent slapping of the pistons.

These and other objects are attained by the means described herein and disclosed in the accompanying drawing in which:—

Fig. 1, is a transverse sectional view of an internal combustion engine embodying my invention.

Fig. 2 is an enlarged sectional view on line 2—2 of Fig. 1.

Fig. 3, is an enlarged sectional view on line 3—3 of Fig. 1.

Fig. 4, is an enlarged sectional view on line 4—4 of Fig. 1.

My invention consists in providing a piston rod D that extends thru the explosion chamber $a$ and projects thru the top $a^4$ of such chamber. The bearings $f^2$, $b^2$, and $b^3$ prevent any but a longitudinally reciprocating motion of the piston rod D, said bearings avoiding any injury to the cylinder walls because of the thrust of the crank shaft upon the connecting rod, such thrust being taken by the bearings. The bearings $f^2$, $b^2$ and $b^3$ are removable and adjustable, whereby the wear upon these bearings can be readily remedied.

The cylinder A is constructed similarly to the cylinders of the ordinary combustion engine cylinder used on automobiles, aeroplanes, etc., but is not as long as the cylinders in such other engines in proportion to the other parts of the engine, being slightly longer than the length of the stroke of the piston. The gases are drawn into and exhausted from the combustion chamber $a$ in the same manner as in the ordinary type of engine referred to. A water jacket $a^2$ encircles the combustion chamber. If the engine is to be air cooled, the water jacket is dispensed with, the outer surface of cylinder wall $a'$ being employed as the radiating surface. The top $a^4$ of the cylinder is bored, the walls of the bore $a^5$ forming a bearing for the piston rod D.

The base chamber housing B is attached to the cylinder A by means of the bolts $b$ passing thru flanges $a^3$ and $b'$ formed on the cylinder and on housing B respectively. The guide plate or cross head bearings $b^2$ and $b^3$ are secured to the housing B and comprise parallel bearings between which the guide block or tail bearings $d^5$ mounted upon the piston rod D is reciprocated. The guide plates have a series of lugs $b^4$ having threaded bores $b^5$ in which the screws $b^6$ formed on the ends of the lock screws $b^7$ engage. The adjustment screws $b^9$ are split and are adapted to engage the threads $b^{10}$ formed on the bore $b^8$ in the housing. The adjustment screws have a tapering central bore thru which the lock screws $b^7$ extend. The lock screw is tapered, such tapered section being adapted to engage the tapered bore in the adjustment screw. A square head $b''$ is formed on the lock screw.

The piston rod D has the piston $d$ mounted thereon by means of the screw collar $d'$ and pin $d^2$ passing thru the collar and the rod. The piston can be cast to substantially the diameter of the chamber $a$. The rough edges are removed from the piston and a seat $d^3$ for the split piston ring $d^4$ formed thereon. The piston does not contact the cylinder walls, therefore the piston does not require any grinding. A cross head or guide block $d^5$ is mounted on the lower end of the piston rod, and between the arms $d^6$ and $d^7$ of such block is pivotally mounted the connecting rod C, by means of the wrist pin $c$. The block $d^5$ is adapted to be reciprocated between the guide plates or tail bearings $b^2$ and $b^3$. The slots or spaces between the arms $d^6$ and $d^7$ of the block $d^5$ and between the arms $b^{12}$ and $b^{13}$ and arms $b^{14}$ and $b^{15}$ of the bearings $b^2$ and $b^3$ respectively, are in alignment so that the connecting rod C can swing between such arms without contacting them. The connecting rod C is pivotally attached to the crank shaft $C'$.

A screw plug F is mounted on the cylinder head $a^6$ and has a central bore $f$ in alignment with the piston rod D. The plug secures the packing $f'$ about the piston rod and the top of the bore $a^5$ and forms a head bearing $f^2$ for the piston rod. The chamber $f^3$ within the plug F, in which the rod D reciprocates, may be enlarged and be developed into a pump by means of the inlet valve $f^4$ and outlet valve $f^5$ in the pump discharge nozzle $f^6$. The contacting faces of the guide plates and the guide block $d^5$ can be made in any shape or form. The main purpose of this bearing arrangement is to avoid any thrust of the connecting rod being directed upon the cylinder wall, and to assure only a longitudinal movement of the piston.

The operation of my device is as follows:

The explosion of the gases within the explosion chamber $a$ drives the piston $d$ and piston rod D downward and toward the crank shaft $C'$. The force of the explosion is transmitted thru the wrist pin from the piston rod to the connecting rod and then to the crank shaft. The tendency to turn the piston rod upon the wrist pin is checked immediately by the bearings $b^2$ and $b^3$ and the entire force of the explosion is directed upon the crank shaft. When the connecting rod then moves the piston rod upward, the bearings $b^2$ and $b^3$ again take up any pressure that is directed in any direction other than the line of reciprocation of the piston rod, thereby taking up the thrust of the crank shaft. The bearing $f^2$ in the plug F cooperates with the bearings $b^2$ and $b^3$ in preventing any but a longitudinal movement of the piston rod. As the piston moves downward, the air below the piston $d$ and within the cylinder wall $a'$ is expelled, and as the piston moves upward this wall $a'$ is again exposed to the air, subjecting the interior of the cylinder walls to cool air and thereby cooling the cylinder to some extent. Due to this repeated subjection of the walls to the air, the lubricating oil on the cylinder wall and piston ring is not subject to carbonization in the same degree as in other types of engines, therefore using less oil, keeping the cylinder in a better state of lubrication and avoiding formation of excess carbon in the combustion chamber.

Due to the fact that the piston does not contact the cylinder walls, and because the piston cannot grind or cut into the cylinder wall, the piston can be made very thin in cross section and with side walls $b^{16}$ of a length that will accommodate one piston ring only, said walls being substantially shorter than twice the thickness of a piston ring thereby making it possible to use a cylinder of a length substantially equal to the stroke of the piston. This reduction in length of the cylinder makes the engine lighter. Because the cylinder wall will not be defaced, the piston ring will always provide an efficient seal to the combustion chamber, therefore no escaping of gas will result. The oily mist rising from the crank case will lubricate the piston ring, thereby consuming but a little oil.

The thrust of the crank shaft upon the bearings $b^2$ and $b^3$ will wear these bearings, therefore to take up this wear I have provided the adjustment means described. To take up the wear the lock screws $b^7$ are loosened and the adjustment screw $b^9$ screwed into the bore $b^8$ until all of the wear has been taken up. The lock screws $b^7$ are then screwed into the bearings drawing the guide plates into snug contact with the adjustment screws, the tapered surfaces upon the adjustment and locking screws engaging one another and binding them together. In this way a running fit can again be had without grinding any of the engine parts.

The pump developed within the plug F will operate similarly to any plunger type pump, the upper end of the piston rod D acting as the plunger. The air will enter the pump chamber $f^3$ thru valve $f^4$ and will be discharged from the chamber thru valve $f^5$. This pump, integral with the engine, makes it unnecessary to provide an additional pump driven by the engine, as are attached to many automobiles. This stream of air can be used for tire inflation or any other desired purpose.

What I claim is:

1. In a combustion engine having a base chamber casing the combination with a cylinder, of a piston rod extending thru the cylinder top, a head bearing for one end of the piston rod and mounted on the cylinder top, a piston mounted on the rod and within the cylinder, a guide block upon the piston rod, guide plates for the guide block, and means to take up wear of the block and of the guide plates.

2. In a combustion engine having a base chamber housing, the combination with a cylinder, of a piston, a piston rod extending thru the piston and the cylinder top, a substantially U shaped guide block upon the piston rod, slotted guide plates mounted on the housing and engaging the guide block, the slots in the guide plates registering with the slot in the guide block, a connecting rod, and a wrist pin supporting the connecting rod between the arms of the guide block.

3. In a combustion engine having a base chamber casing the combination with guide plates, of means to support the guide plates upon the base chamber housing, means to adjust the plates upon the casing and means to secure the guide plates, the support means, the adjustment means, and the casing to one another.

4. The combination with a combustion engine having a base chamber casing, of guide plates adapted to support a piston rod, means to mount the guide plates upon the base chamber housing and adjacent the piston rod, and means to adjust the guide plates in relation to the piston rod.

5. The combination with a combustion engine having a base chamber casing, of guide plates adapted to support a piston rod, means to mount the guide plates upon the base chamber casing adjacent the piston rod, and means to adjust the piston and rod to a relation central to the cylinder bore by means of the guide plates.

In witness whereof, I have hereunto subscribed my name this 26th day of June, 1920.

JOHN T. RAUEN.